(12) United States Patent
Arnurius

(10) Patent No.: US 8,814,180 B1
(45) Date of Patent: Aug. 26, 2014

(54) TARP TOW

(71) Applicant: Mark Edward Arnurius, Piney Flats, TN (US)

(72) Inventor: Mark Edward Arnurius, Piney Flats, TN (US)

(*) Notice: Subject to any disclaimer, the term of this patent is extended or adjusted under 35 U.S.C. 154(b) by 0 days.

(21) Appl. No.: 13/830,768

(22) Filed: Mar. 14, 2013

(51) Int. Cl.
*B60D 1/14* (2006.01)
*B62B 15/00* (2006.01)
*B60D 1/48* (2006.01)

(52) U.S. Cl.
CPC .............. *B62B 15/007* (2013.01); *B60D 1/485* (2013.01); *B60D 1/143* (2013.01)
USPC ............................................... 280/19; 280/24

(58) Field of Classification Search
CPC .. B62B 15/00; B62B 15/007; B62B 2202/42; B62B 17/00; B60D 1/143; B60D 1/485
USPC .................. 280/845, 18, 19, 20, 24
See application file for complete search history.

(56) References Cited

U.S. PATENT DOCUMENTS

| | | | | |
|---|---|---|---|---|
| 641,113 | A * | 1/1900 | Ingells | 280/11 |
| 768,358 | A * | 8/1904 | Davis | 172/612 |
| 1,064,237 | A * | 6/1913 | McClure | 280/19 |
| 2,893,753 | A * | 7/1959 | Baker | 280/501 |
| 3,222,080 | A * | 12/1965 | Kinraide | 280/18 |
| 3,721,454 | A * | 3/1973 | Anderson | 280/24 |
| 3,727,937 | A * | 4/1973 | Maki, Jr. | 280/24 |
| 3,731,946 | A * | 5/1973 | Westcott | 280/24 |
| 3,762,736 | A * | 10/1973 | Johnson et al. | 280/24 |
| 3,797,846 | A * | 3/1974 | Pevic | 280/24 |
| 4,046,393 | A * | 9/1977 | Vadnais | 280/19 |
| 4,214,776 | A * | 7/1980 | Nurse | 280/760 |
| 4,364,575 | A * | 12/1982 | Schlumberger et al. | 280/19 |
| 4,651,451 | A * | 3/1987 | Beeley et al. | 37/219 |
| 4,856,799 | A * | 8/1989 | Hawn | 280/24 |
| 5,104,133 | A * | 4/1992 | Reiner | 280/19 |
| 5,465,993 | A * | 11/1995 | Gee et al. | 280/491.5 |
| 5,529,321 | A * | 6/1996 | Thompson | 280/19 |
| 5,755,454 | A * | 5/1998 | Peterson | 280/491.1 |
| 5,967,532 | A * | 10/1999 | Mooney | 280/24 |
| 6,276,698 | B1 * | 8/2001 | Calandra | 280/19 |
| 6,364,324 | B1 * | 4/2002 | Buchanan | 280/15 |
| 6,565,101 | B2 * | 5/2003 | Jones et al. | 280/19 |
| 6,651,414 | B1 * | 11/2003 | Sowers | 56/16.8 |
| 6,685,212 | B1 * | 2/2004 | Penlerick et al. | 280/495 |
| 6,708,776 | B2 * | 3/2004 | Harwood | 172/612 |
| 7,032,906 | B1 * | 4/2006 | Wright | 280/24 |
| 2006/0055130 | A1 * | 3/2006 | Williams, Jr. | 280/24 |
| 2012/0074679 | A1 * | 3/2012 | Kinsey | 280/845 |
| 2013/0181416 | A1 * | 7/2013 | Ross | 280/18 |

\* cited by examiner

*Primary Examiner* — Katy M Ebner
*Assistant Examiner* — Emma K Frick

(57) ABSTRACT

It is connected to a lawn tractor or vehicle for towing any foldable sheet type material such as a tarp, (construction) plastic, or cloth across the ground to move large debris or material. This assembly contains multiple tubing, stabilizers, and hardware that allow a direct connection to a lawn tractor or a vehicle/ATV using a standard receiver type hitch. The sheet material is folded and then rolled onto the tarp connection tube and then attached to the tarp support tube. When towing, the clamping point gets tighter the harder you pull on it, making it a strong connection. Now the material is tightly gripped between these two tubes, which allow the use of any type of foldable sheet material for towing. This design eliminates the need to use any type of grommet load connection points within the sheet material that could be easily pulled out during heavy loads or use.

3 Claims, 21 Drawing Sheets

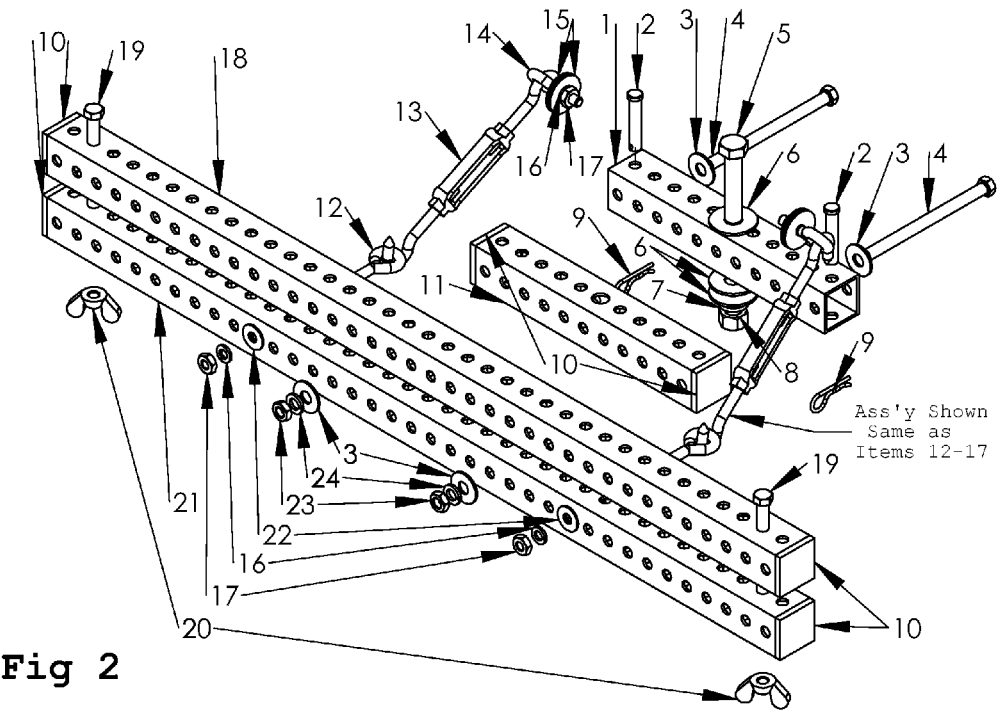

Fig 2

| ITEM NO. | Build of Material (BOM) of FIG. 2 | QTY. |
| --- | --- | --- |
| 1 | Det.01 Tractor Main Support HD 1.75 Tubing | 1 |
| 2 | Det.02 Clevis Pin .4375 x 2.25 inch | 2 |
| 3 | Preferred Wide FW 0.4375 | 4 |
| 4 | HFBOLT 0.4375-14x6x1.125-N | 2 |
| 5 | HFBOLT 0.625-11x3x1.5-N | 1 |
| 6 | Regular FW 0.625 | 3 |
| 7 | Regular LW 0.625 | 1 |
| 8 | HNUT 0.6250-11-D-N | 1 |
| 9 | Det.09 Hairpin Cotter MK MK 16 | 2 |
| 10 | Det.10 Plastic End Caps Tubing | 6 |
| 11 | Det.11 Spacer HD 1.75 Tubing | 1 |
| 12 | Det.12 Eyebolt .375 x 2.5inch | 2 |
| 13 | Det.13 Turnbuckle .375 x 10.25inch | 2 |
| 14 | Det.14 Eyebolt .375 x 1.0 | 2 |
| 15 | Det.15 - .375 x 1.5 Zinc Finish Fender Washer | 4 |
| 16 | Regular LW 0.375 | 4 |
| 17 | HHJNUT 0.3750-16-D-N | 4 |
| 18 | Det.18 Tarp Connector HD 1.75 Tubing | 1 |
| 19 | HFBOLT 0.4375-14x4x1.125-N | 2 |
| 20 | Det.20 .4375 Wingnut | 2 |
| 21 | Det.21 Tarp Support HD 1.75 Tubing | 1 |
| 22 | Regular FW 0.375 | 4 |
| 23 | HJNUT 0.4375-14-D-N | 2 |
| 24 | Regular LW 0.4375 | 2 |

DETAIL C

Detail H

| ITEM NO. | PART NUMBER | QTY. |
|---|---|---|
| 27 | Det.027 Receiver Adapter Tubing | 1 |
| 28 | Det.028 Support Adapter Tubing | 1 |
| 29 | HFBOLT 0.625-11x4.5x1.5-N | 2 |
| 30 | Preferred Wide FW 0.625 | 4 |
| 31 | HNUT 0.6250-11-D-N | 2 |
| 32 | Standard 2" Receiver Hitch | 1 |

TARP TOW

BACKGROUND OF THE INVENTION

The invention relates to the moving of landscape and/or garden type material such as trees, branches, leaves, grass clippings, mulch, plants, rocks, sand, snow, and other types of debris by loading them onto any foldable tarp or sheet material that is directly attached to the rear of a riding lawn tractor.

This invention makes it very easy to move large and awkward-sized loads of debris around obstacles and through difficult types of terrain because of its design. Also, loading debris onto the Tarp Tow is very simple because the attached tarp or sheet is at ground level and unloading it is just as easy. To unload, just go to one of the end corners of the tarp or sheet and pull it over the top of the debris. This causes the debris to fall off the sheet exactly where you want it as it flips over, while using the riding lawn tractor as an anchor point.

The Tarp Tow assembly contains multiple tubes, turnbuckle stabilizer assemblies and the needed hardware. There are two main features in this invention. First, the tarp tow assembly is attached directly to a lawn tractor and it does not use any type of cables, chains, or ropes as a load connection point. Second, it has the ability to hold any type of foldable tarp or sheet material by rolling it onto the tarp connection tube and then clamping it down to the tarp support tube within the assembly. The load is directly transferred from the tarp or sheet material into the tarp tow assembly at this connection point then into the frame of the riding lawn mower.

The Tarp Tow was created for the purpose of putting all the work of moving debris and/or material onto a riding lawn mower. The Tarp Tow was designed to use any type of foldable tarp or sheet material because of how it connects within the tarp tow assembly.

BRIEF DESCRIPTION OF THE DRAWINGS

FIG. 2 is an isometric exploded view of the Tarp Tow assembly with a Build of Material listing all of its components.

FIGS. 2, 8-9).

DETAILED DESCRIPTION OF THE INVENTION

This is a description of the Tarp Tow invention with all the parts within the assembly that can be used to attach to a lawn tractor's rear mount or be connected to a standard receiver type hitch mount. The material size, hole, and hardware locations are not limited to what is listed below. The Tarp Tow materials and hardware can increase or decrease in size depending on the load requirement of the tractor or vehicle the tarp tow is being installed onto. The Tarp Tow Build of Material (BOM) for a lawn tractor is shown under item numbers 1-24 on sheet 2, FIG. 2. The adapter tubes and hardware for a standard receiver type hitch mount are shown under item numbers 27-31 in the BOM on sheet 19, FIG. 38.

Figure 1:
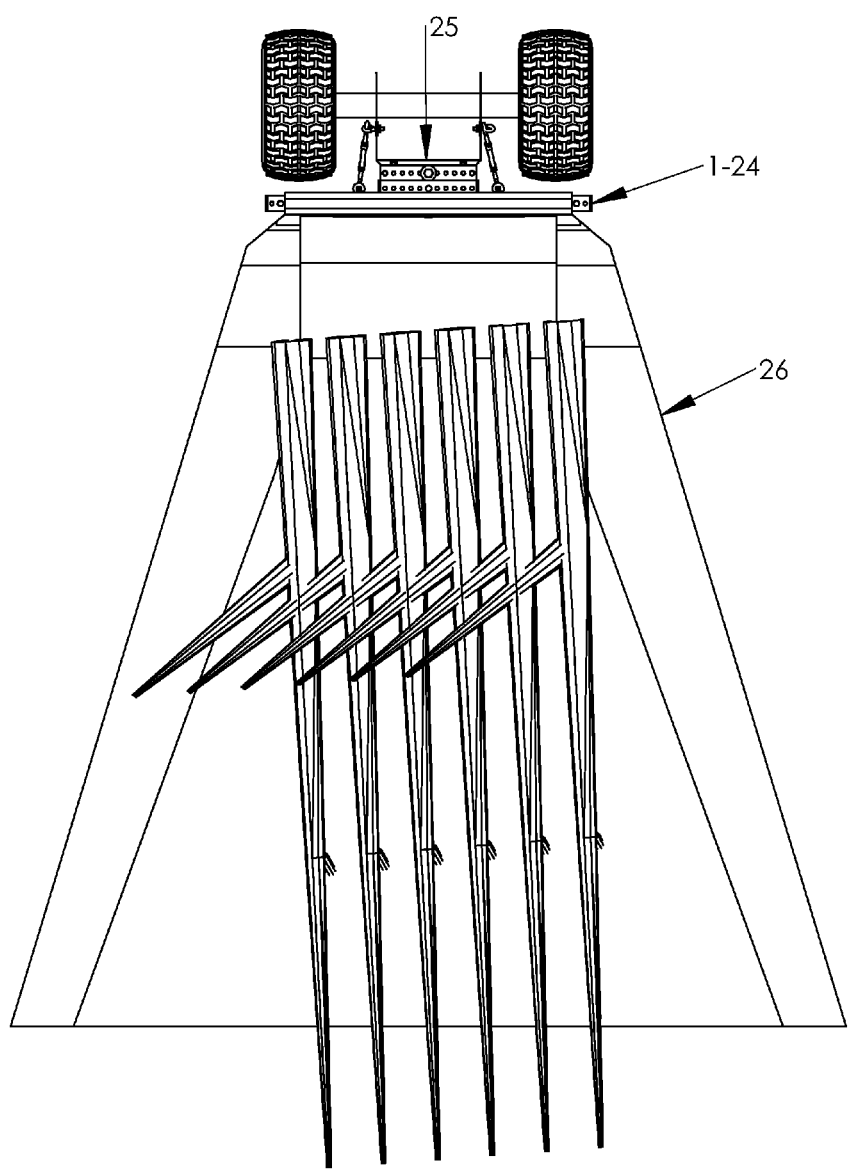
FIG. 1 is a view of the Tarp Tow assembly connected to a lawn tractors rear plate or hitch, while using a tarp or plastic sheet to tow multiple large tree branches.
Figure 3:
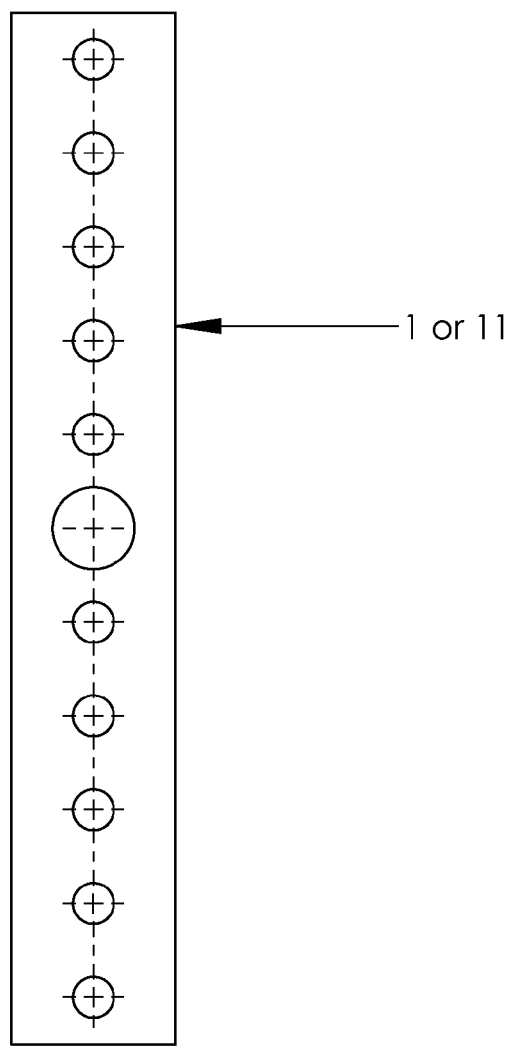
FIG. 3 is a top view of the tractor main support tube or the spacer tube.
Figure 4:
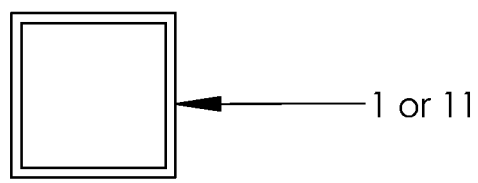
FIG. 4 is a side view of the tractor main support tube or the spacer tube.

The first parts of the BOM for a lawn tractor are items 1 or 11 shown in FIGS. 3 and 4. They are made the same and they are called the tractor main support tube (item 1) and the spacer tube (item 11). Both are 1.75" square hot rolled steel tubing with galvanized finish that is 12 gauge in thickness with 7/16" thru holes on 1" centers on all sides and 11" in length. The center hole position within the tubes are enlarged to a 21/32" thru all.

Figure 5:
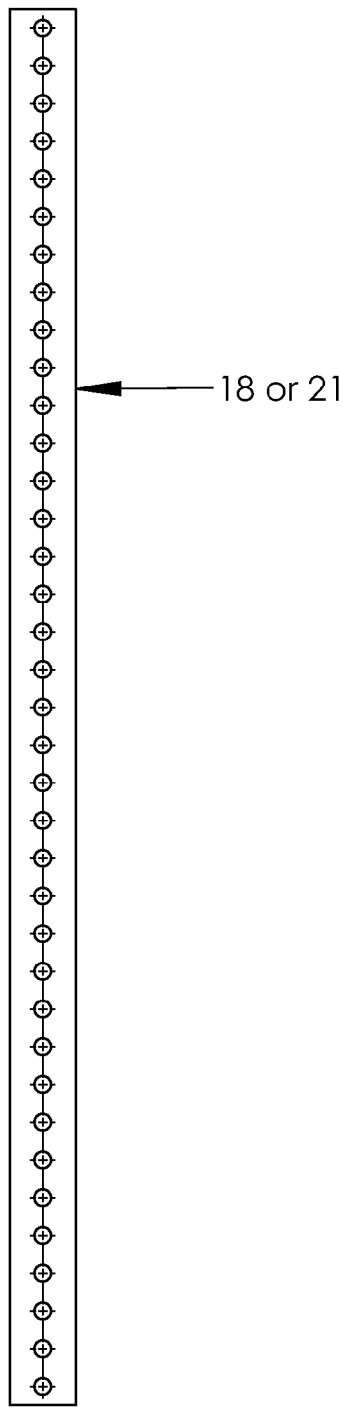
FIG. 5 is a top view of the tarp connector tube or the tarp support tube.
Figure 6:
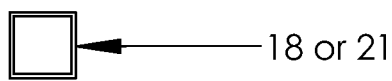
FIG. 6 is a side view of the tarp connector tube or the tarp support tube.

The next parts are used to hold and to clamp the sheet material within the assembly. They are shown in FIGS. 5 and 6, which are made the same and they are called the tarp connector tube (item 18) and the tarp support tube (item 21). Both are 1.75" square galvanized steel tubing that is 12 gauge in thickness with 7/16" thru holes on 1" centers on all sides and 37" in length.

Figure 38:
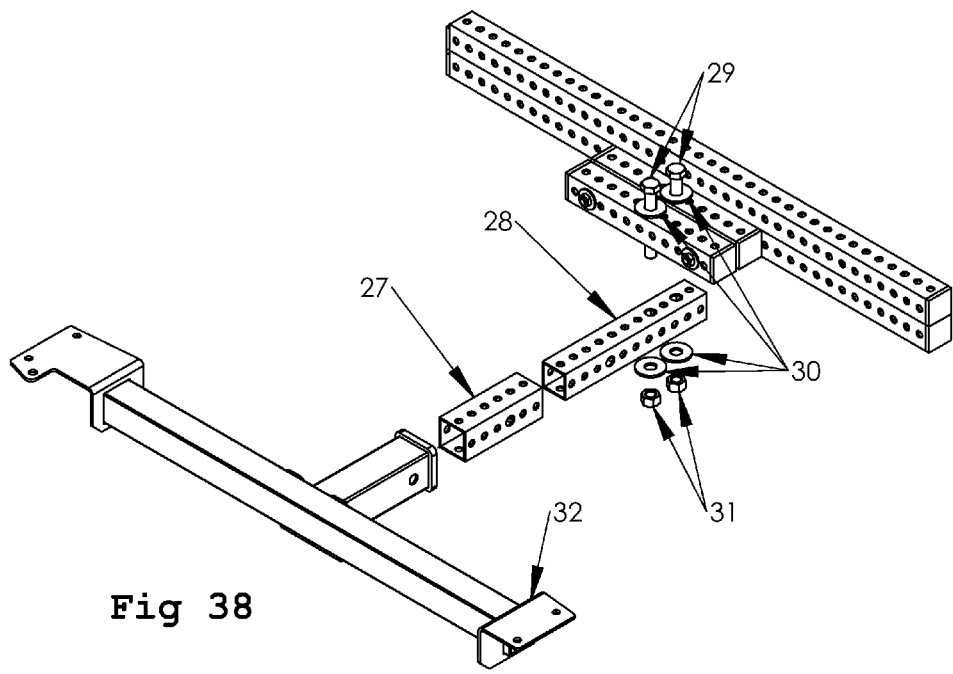
FIG. 38 is an isometric exploded view of the adapter kit for attachment to a standard receiver type hitch with the Build of Material listing all of the components.
Figure 39:
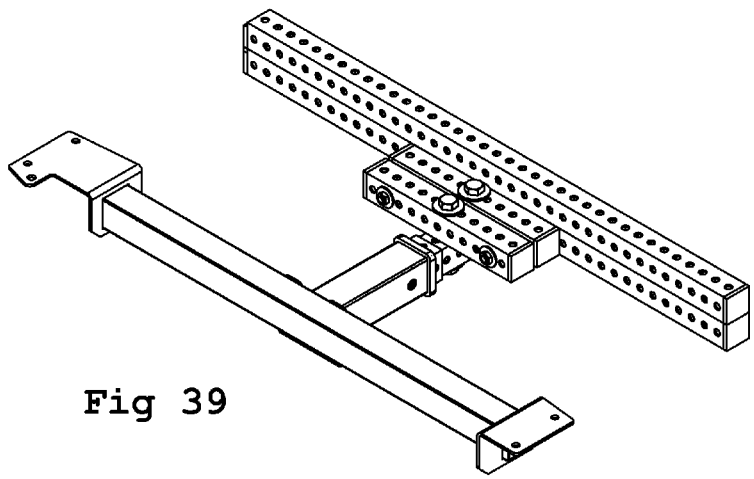
FIG. 39 is an isometric view of the secondary connection method of the Tarp Tow assembly connected to a standard receiver type hitch.
Figure 40:
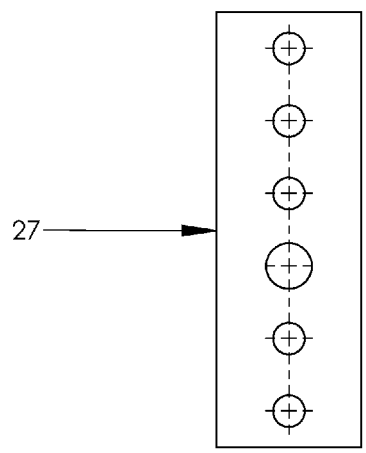
FIG. 40 is a top view of the receiver adapter tube.
Figure 41:
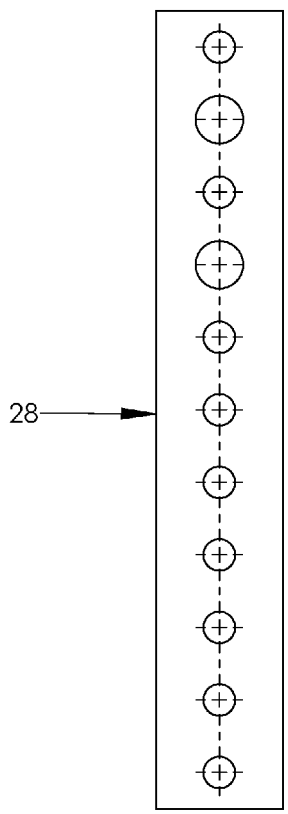
FIG. 41 is a top view of the support adapter tube.
Figure 42:
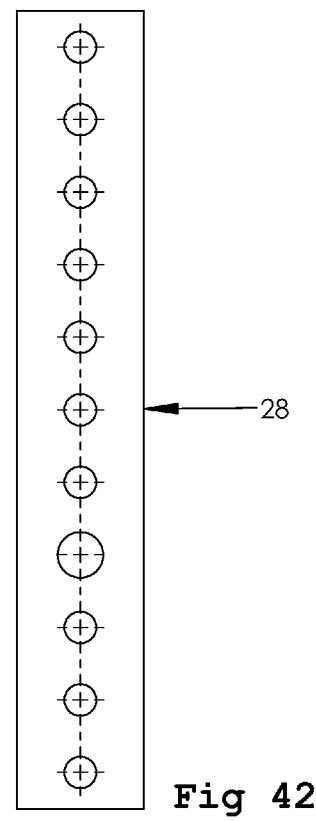
FIG. 42 is a side view of the support adapter tube.

The standard receiver type hitch mount is shown in FIGS. 38-39. The receiver adapter tubing (item 27) shown in FIG. 40 is made from 2.0" square galvanized steel that is 12 gauge in thickness with 7/16" thru holes on 1" centers on all sides and 6" in length. The third hole position from the bottom within the tube is enlarged to a 21/32" thru all for use within the standard receiver type hitch mount (item 32). The support adapter tube (item 28) shown in FIGS. 41 and 42 is made from 1.75" square galvanized steel that is 12 gauge in thickness with 7/16" thru holes on 1" centers on all sides and 11" in length. FIG. 41 shows the top view of the support adapter tube (item 28) where the second and fourth hole position is enlarged to a 21/32" thru all. FIG. 42 shows a side view of the support adapter tube (item 28) where the fourth hole from the bottom is enlarged to a 21/32" thru all for use when connected to the standard receiver type hitch (item 32).

Assembly of Invention with Hardware

Figure 7:
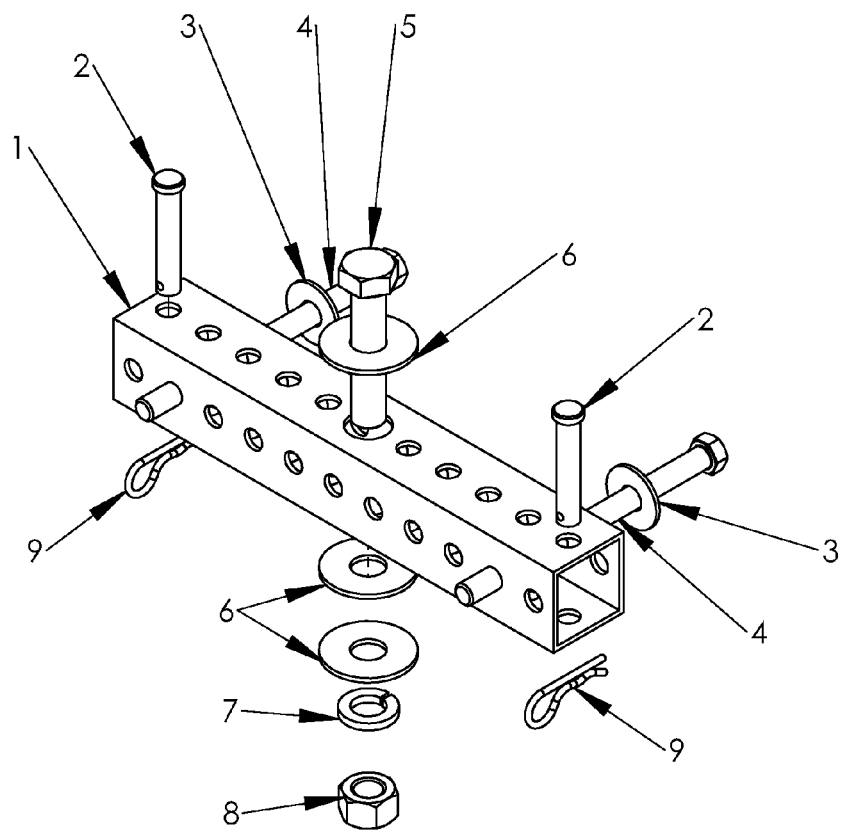
FIG. 7 is an isometric exploded view of the tractor main support tube of the Tarp Tow assembly with all its hardware shown.
Figure 8:
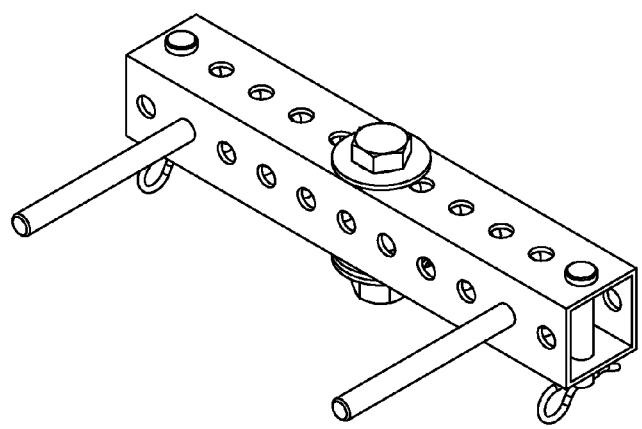
FIG. 8 is an isometric view of the tractor main support tube of the Tarp Tow assembly.
Figure 9:
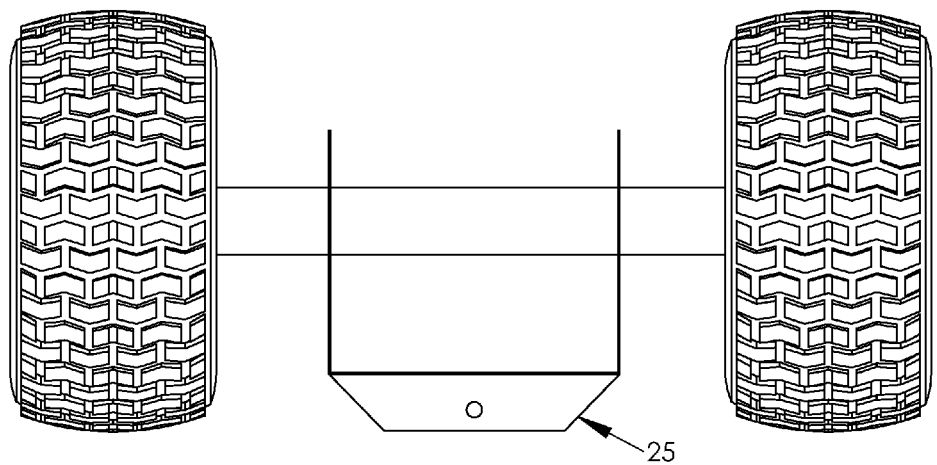
FIG. 9 shows a top view of a typical lawn tractor rear-receiver mounting plate or hitch.
Figure 19:
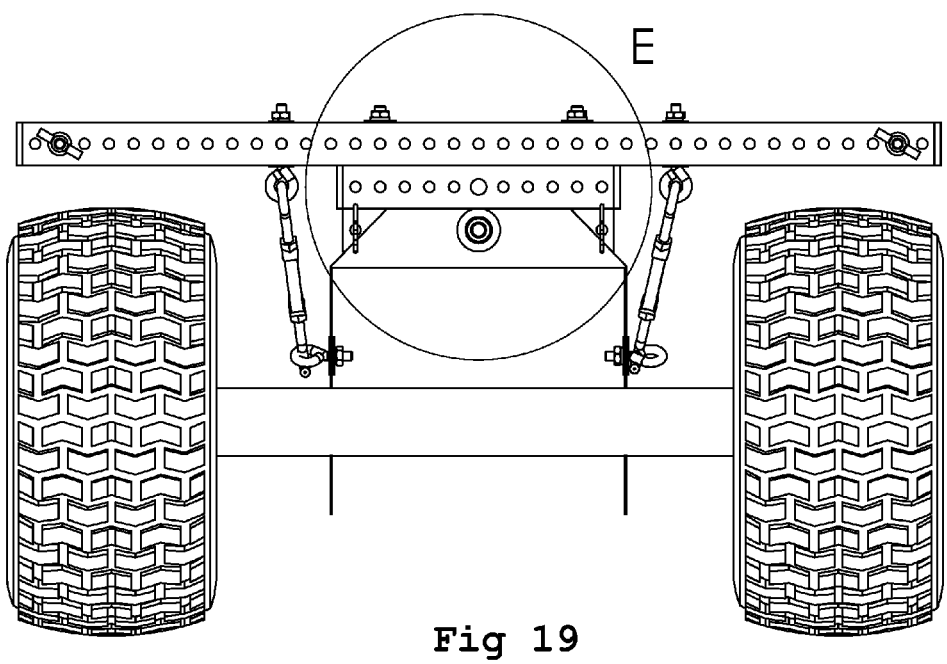
FIG. 19 is a bottom view of the completed Tarp Tow assembly mounted to the rear receiver plate or hitch and frame of a lawn tractor.
Figure 20:
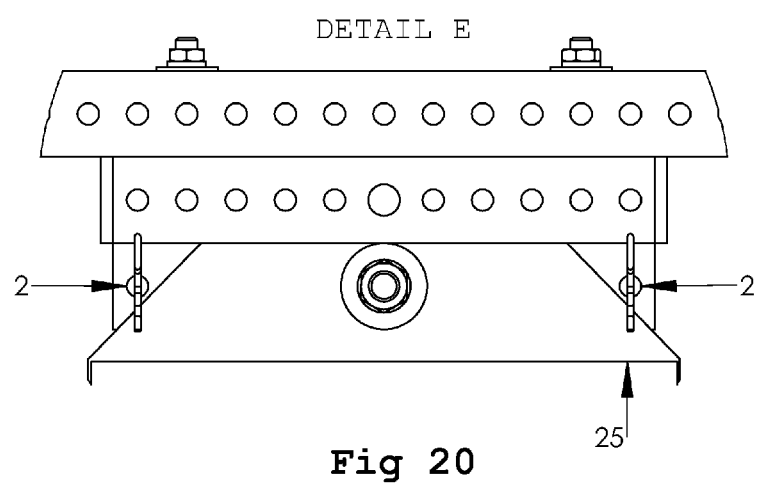
FIG. 20 is a detailed view "E" of the bottom view shown in FIG. 19.

The tractor main support tube shown in FIG. 2 (item 1) is the first part of the assembly that is attached to the rear of a lawn tractor (item 25) shown in FIG. 9. First, take the tractor main support tube (item 1) shown in FIG. 7 and install two clevis pins (items 2) into the top side of the tube in the first hole locations in each end as shown. Both clevis pins are held in place by two hairpin cotters when installed (item 9). Next a washer (items 3) and a bolt (item 4) are installed thru the back side of the tractor main support tube (item 1) in the second hole position on each end of the tube as shown. The bolt (item 5) and washer (item 6) are installed on the top side center hole position of the tractor main support tube (item 1). On the bottom side of the tractor main support tube (item 1) a second washer (item 6) is placed onto the bolt (item 5) and pushed flush onto the tractor main support tube (item 1). Now this assembly is placed onto the top of the lawn tractor rear receiver plate or hitch (item 25) shown in FIG. 9 and the bolt (item 5) goes thru the receiver hitch thru hole. Next the 3$^{rd}$ washer (item 6), lock washer (item 7), and nut (item 8) are installed on the bolt that is on the back side of the tractor rear receiver plate or hitch shown in FIGS. 19 and 20 and tightened to complete the first part of the Tarp Tow assembly as shown in FIGS. 8 and 10.

Figure 10:
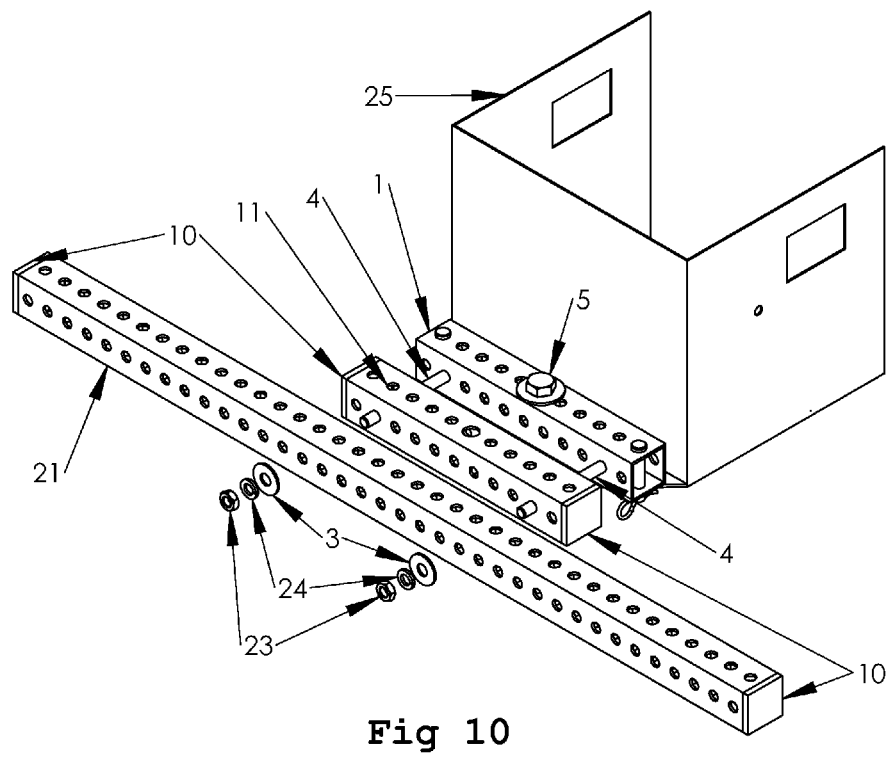
FIG. 10 shows an isometric exploded view of the Tarp Tows lower assembly attaching to the rear-receiver mounting plate or hitch (ref.

Next the spacer tube (item 11) has two plastic end caps (item 10) installed into each end and then it is centered between the two bolts (item 4) and pushed flush against the tractor main support tube (item 1) as shown in FIG. 10. Then the tarp support tube (item 21) has two plastic end caps (item 10) installed into each end and then it is centered between the two bolts (item 4) and pushed flush against the spacer tube (item 11) as shown in FIG. 10. Now, two washers (item 3), two lock washers (items 24) and two nuts (items 23) are installed on the two bolts (item 4) and tightened to complete the lower Tarp Tow assembly also shown in FIG. 10.

Figure 11:
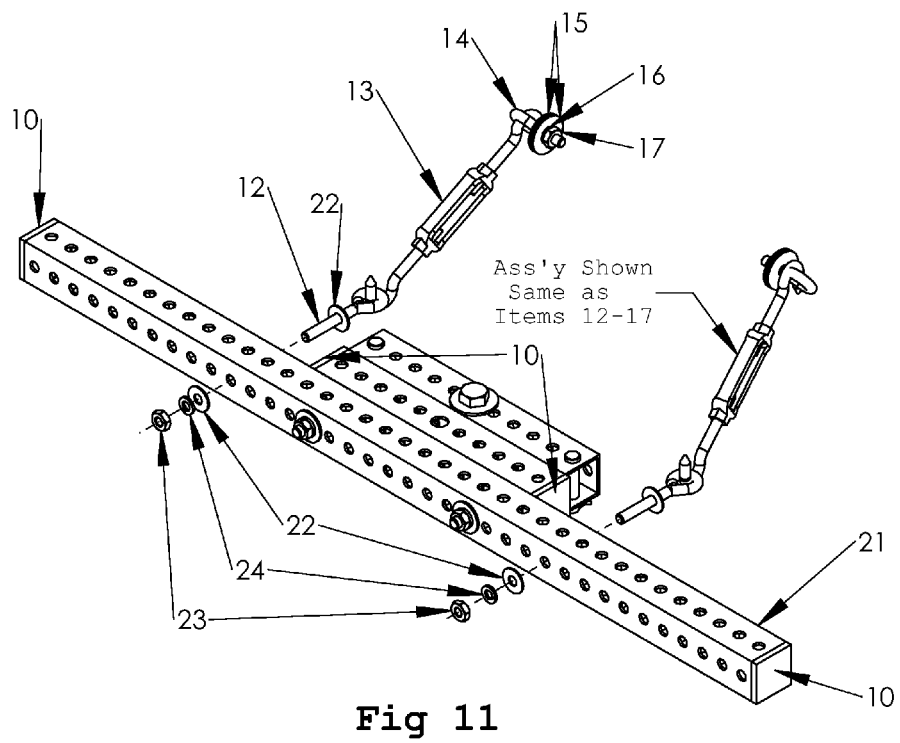
FIG. 11 shows an isometric view of the completed lower section of the Tarp Tow with the support arm assemblies in exploded view.

Next in FIG. 11, install two eye bolts (item 12) and two 3/8" washers (item 22) and slide them into the back side of the tarp support tube (item 21) as shown. On the other side of the tarp support tube (item 21) place the two 3/8" washers (item 22), lock washers (item 24), and nuts (item 23) and tighten them on the eye bolts (item 12). Get the turnbuckles (item 13) and connect them into the eye bolts (item 12) that are connected to the tarp support tube (item 21) and then take the other side of the turnbuckles and connect them into the frame of the lawn tractor (item 25) as shown in FIGS. 12, 14-19. Some tractors already have shoulder bolts or open sheet metal areas to connect them to the frame. If not, using FIGS. 12, 14 and 18 as a reference, try to find a location for mounting the support assemblies by holding the turnbuckle (item 13) between 35 to 45 degrees off the horizon in an area on the frame (item 25) where you can drill a hole and mount the eyebolts (item 14), washers (item 15), lock washers (item 16), and nuts (item 17).

Figure 12:
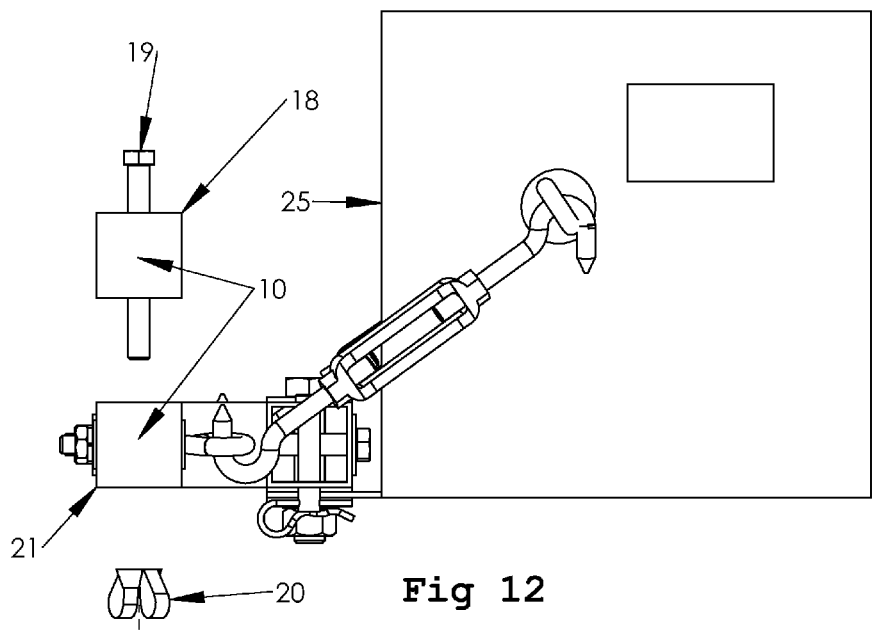
FIG. 12 is a side view of the lower and upper section of the Tarp Tow assembly with the support arms attached to the tractor rear receiver and frame.
Figure 13:
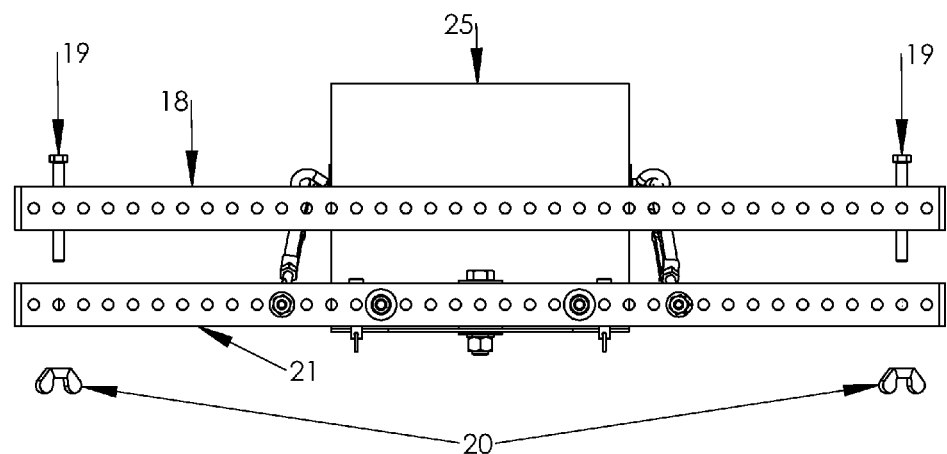
FIG. 13 is a front view of the lower and upper section of the Tarp Tow with the support arms attached to the tractor rear receiver and frame.
Figure 14:
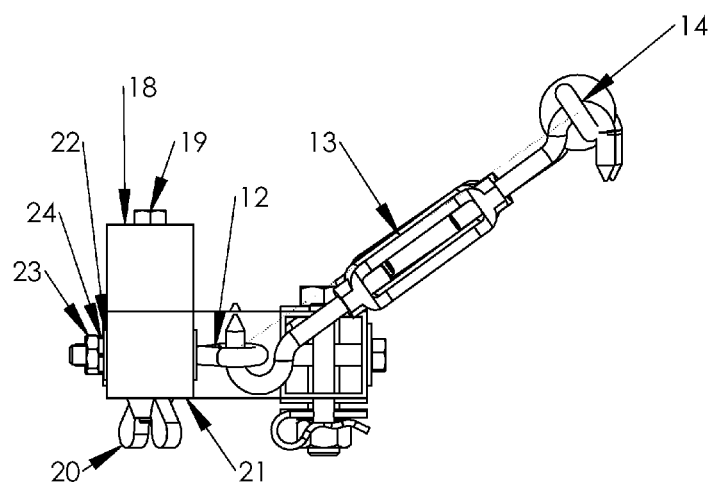
FIG. 14 is a side view of the completed Tarp Tow assembly with all the hardware mounted to the rear receiver plate or hitch and frame of a lawn tractor.
Figure 15:
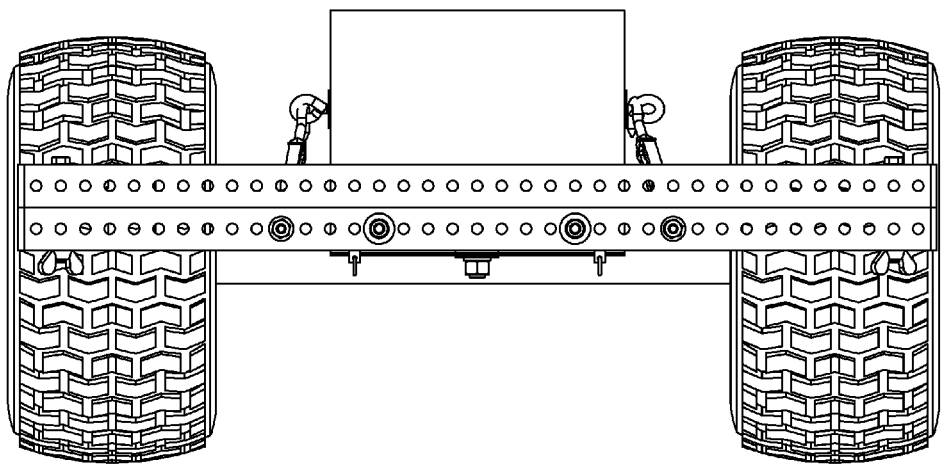
FIG. 15 is a front view of the completed Tarp Tow assembly mounted to the rear receiver plate or hitch and frame of a lawn tractor.
Figure 16:
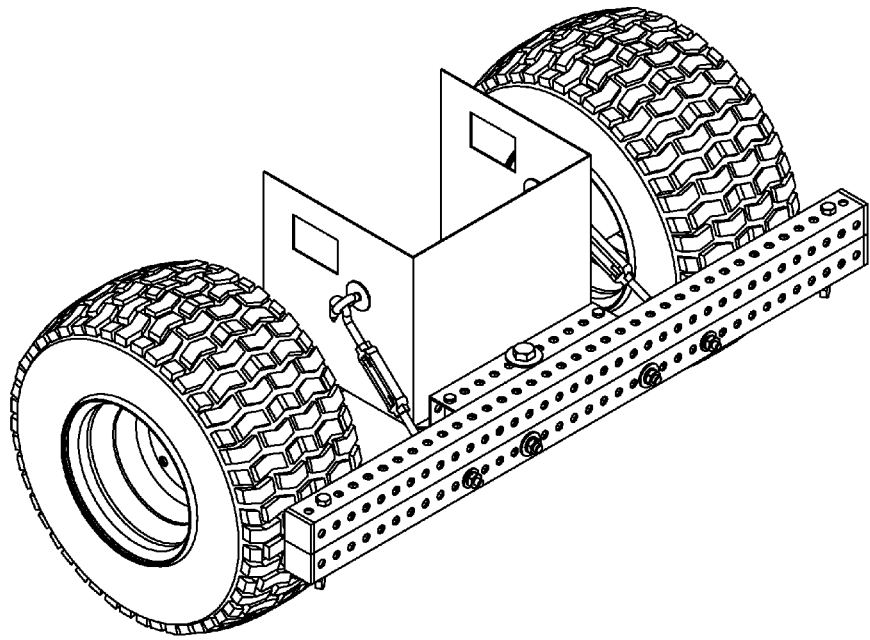
FIG. 16 is an isometric view of the completed Tarp Tow assembly mounted to the rear receiver plate or hitch and frame of a lawn tractor.
Figure 17:
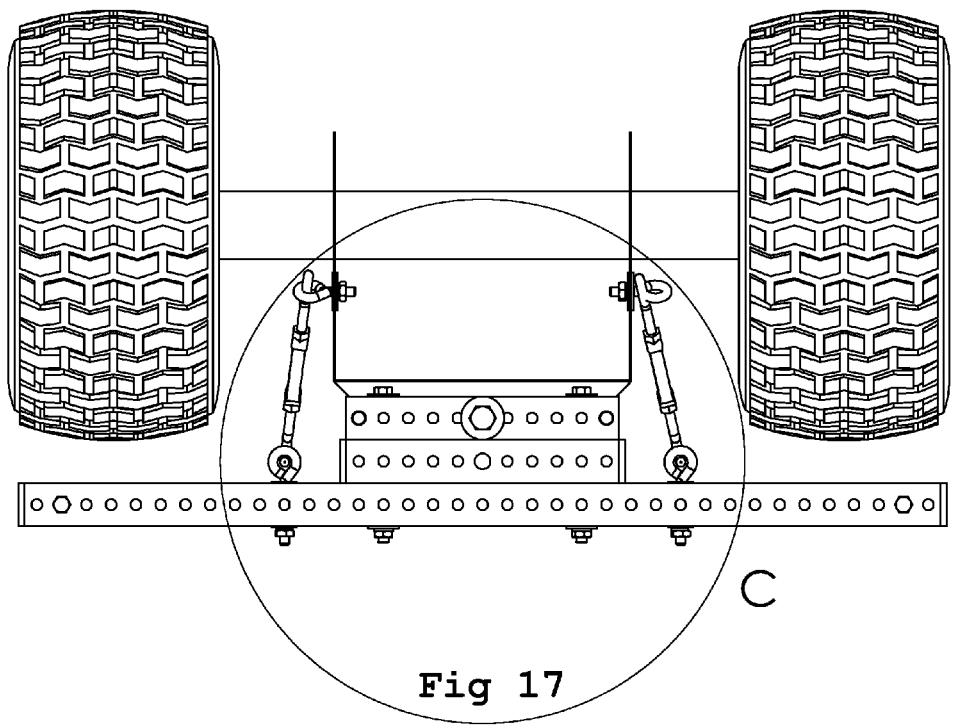
FIG. 17 is a top view of the completed Tarp Tow assembly mounted to the rear receiver plate or hitch and frame of a lawn tractor.
Figure 18:
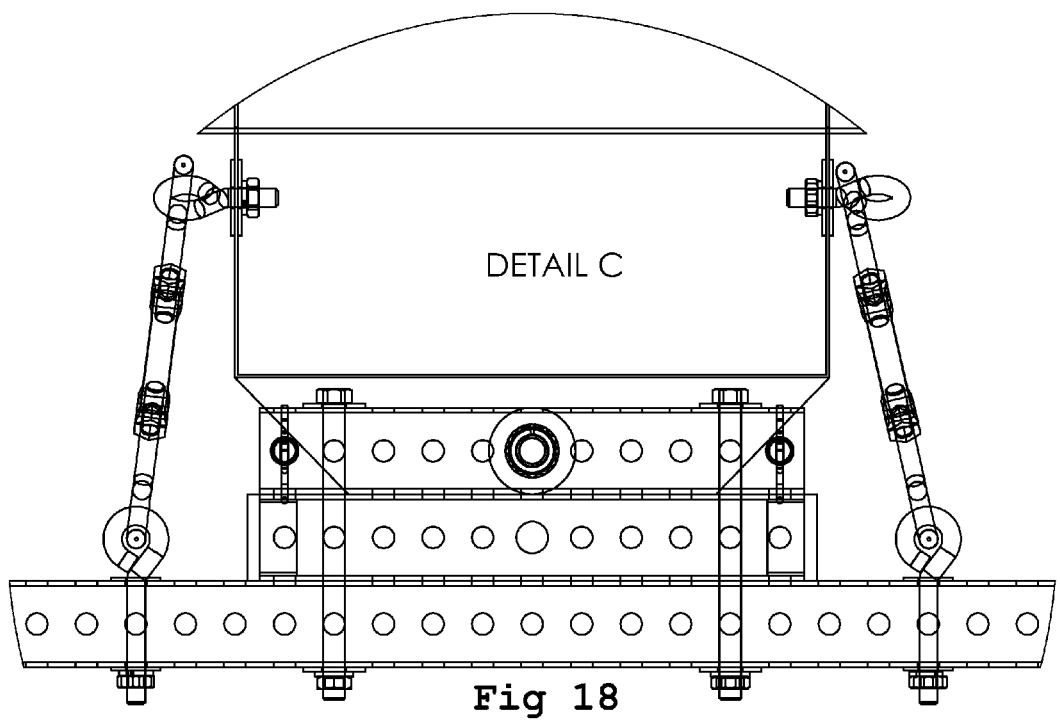
FIG. 18 is a detailed view "C" of the top view shown in FIG. 17.

The tarp connector tube (item 18) has two plastic end caps (item 10) installed into each end and then it is centered onto the top of the tarp support tube (item 21) as shown in FIGS. 12-14. Next, two bolts (item 19) are put thru both tubes on top side at the second hole position from each end to clamp the assembly together using two wing nuts (item 20) to tighten down as shown in FIG. 14. Now the Tarp Tow assembly is ready to have a foldable sheet (item 26) to be connected for use.

FIGS. 15-20 gives different views of what the Tarp Tow assembly looks like without the foldable sheet attached when it is fully installed on a lawn tractor.

Figure 21:
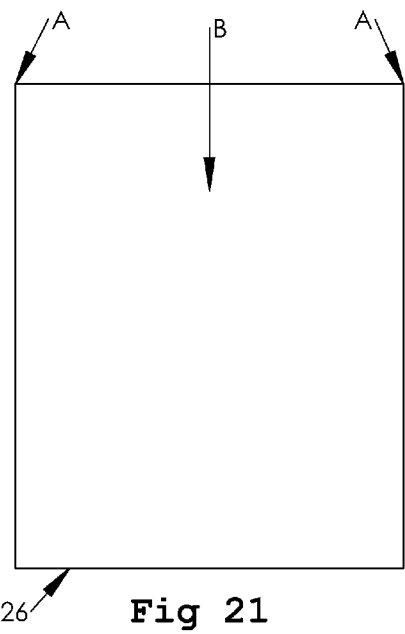
FIG. 21 is a top view of a foldable type sheet.
Figure 22:
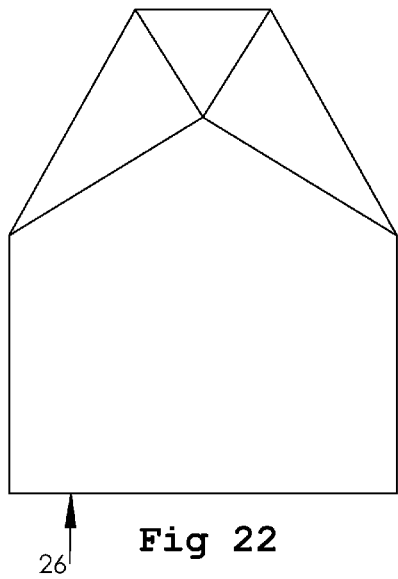
FIG. 22 shows the sheet from FIG. 21 folded.
Figure 23:
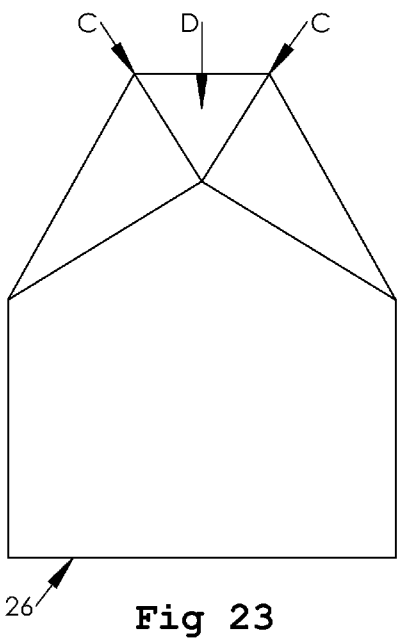
FIG. 23 is a top view of a folded sheet.
Figure 24:
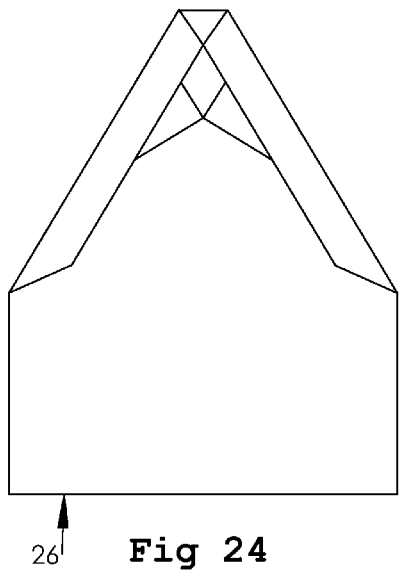
FIG. 24 shows the sheet from FIG. 23 folded.
Figure 25:
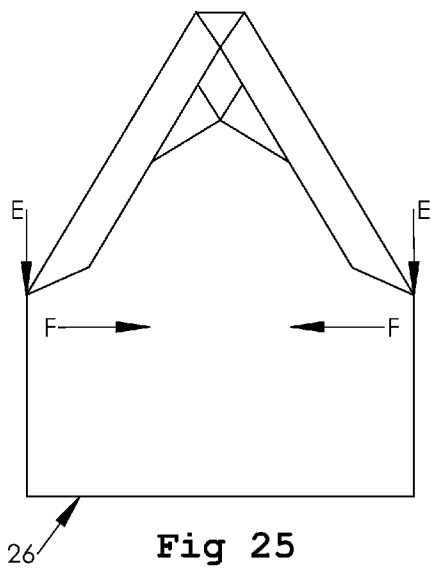
FIG. 25 is a top view of a folded sheet.
Figure 26:
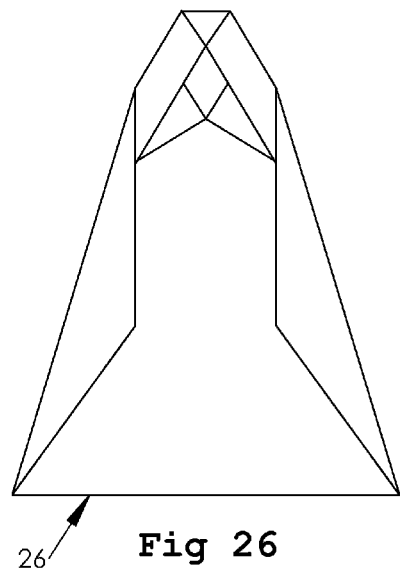
FIG. 26 shows the sheet from FIG. 25 folded.
Figure 32:
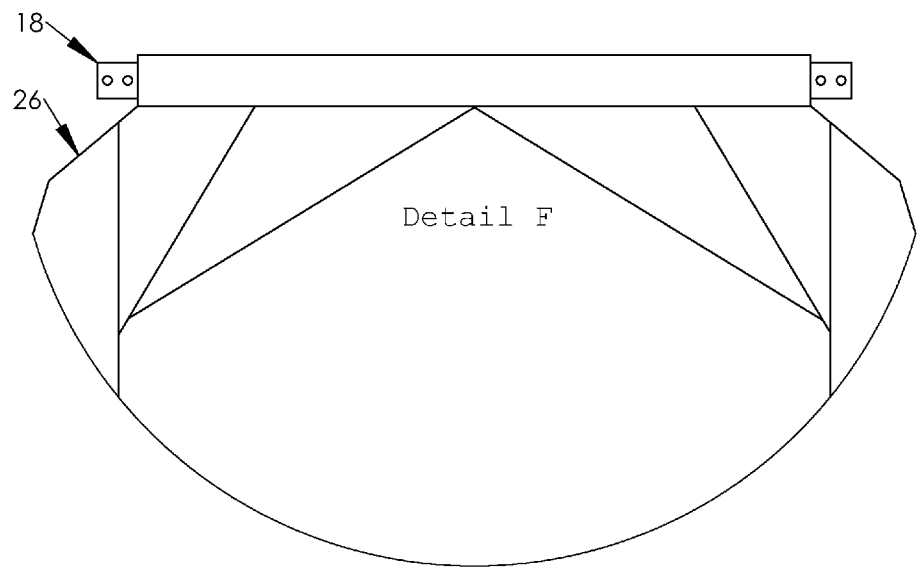
FIG. 32 is a detailed view F from the top view in FIG. 31.
Figure 33:
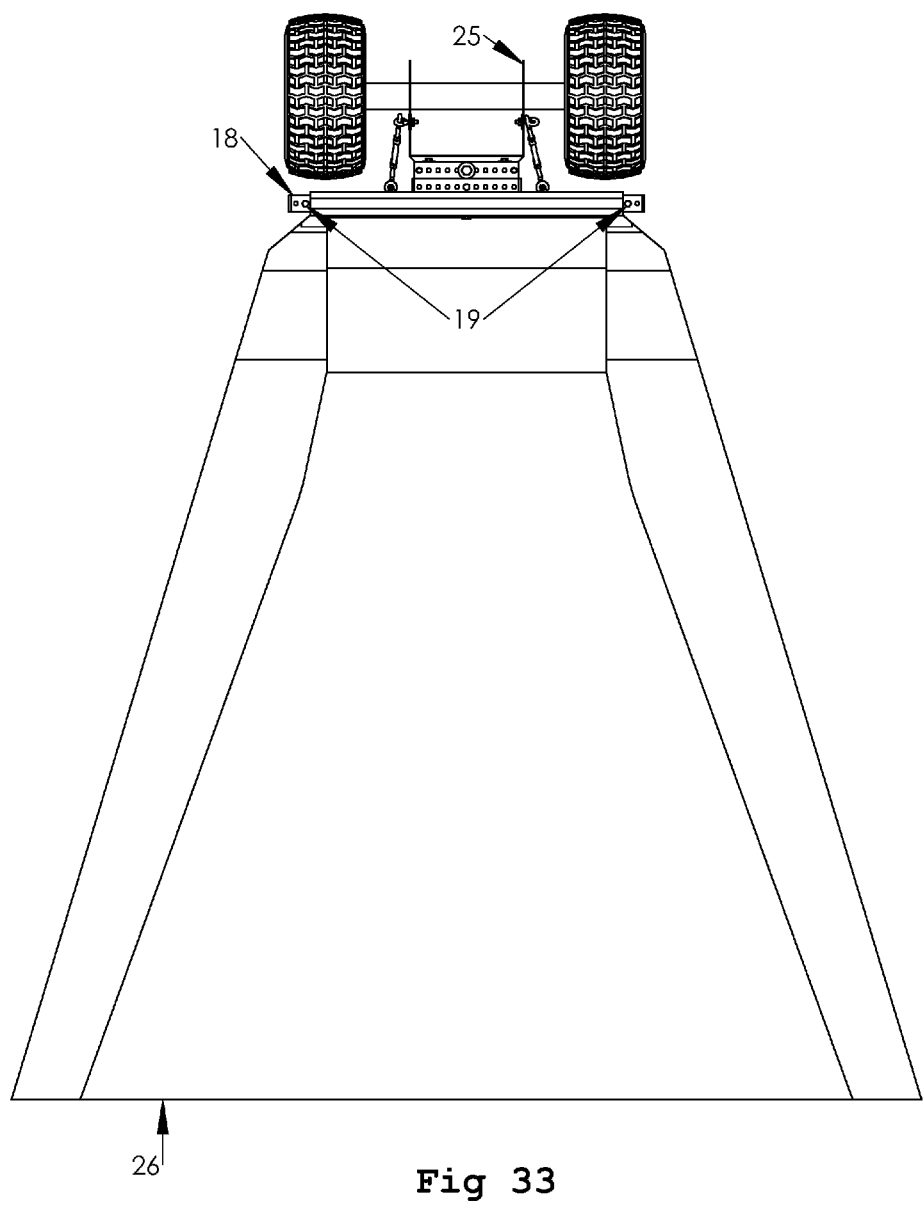
FIG. 33 is a top view of the complete Tarp Tow assembly with tarp or sheet attached to a lawn tractor.
Figure 34:
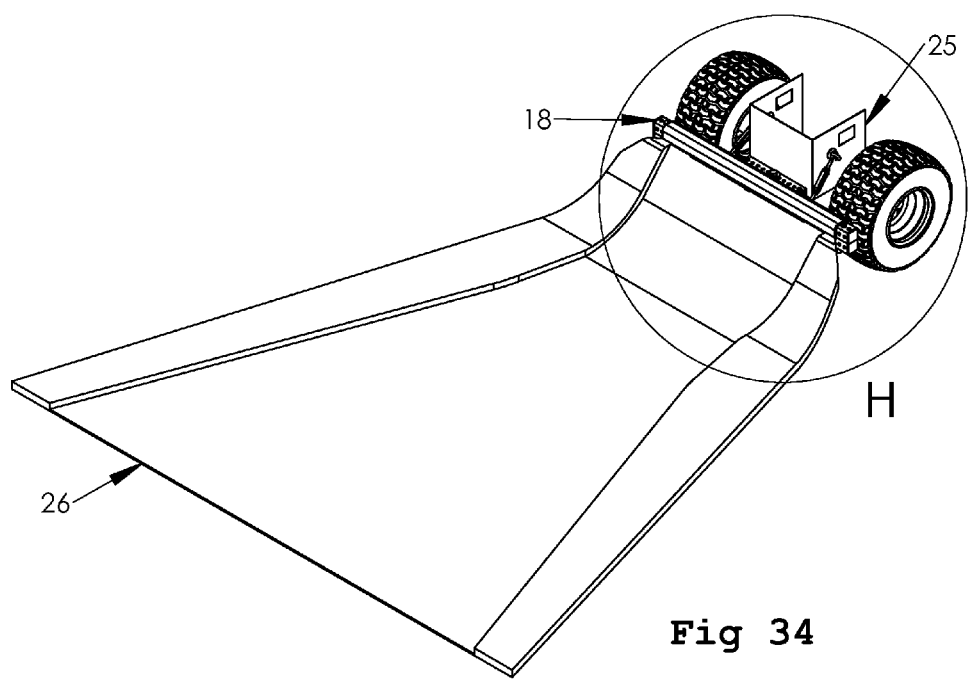
FIG. 34 is an isometric view of the complete Tarp Tow assembly with a tarp or sheet attached to a lawn tractor.
Figure 35:
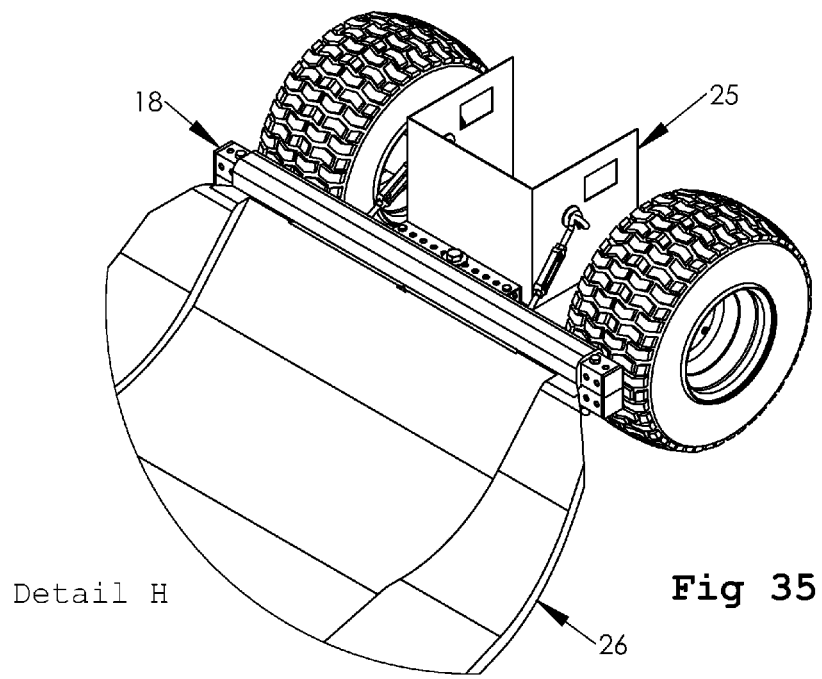
FIG. 35 is a detail view H of the isometric view shown in FIG. 34.
Figure 36:
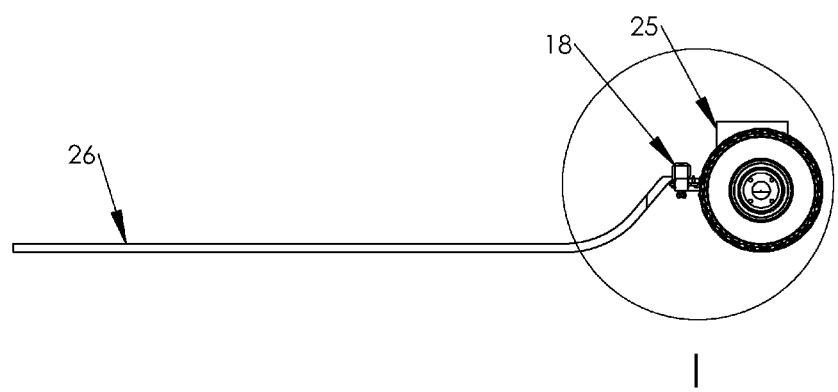
FIG. 36 is a side view of the complete Tarp Tow assembly with a tarp or sheet attached to a lawn tractor.
Figure 37:
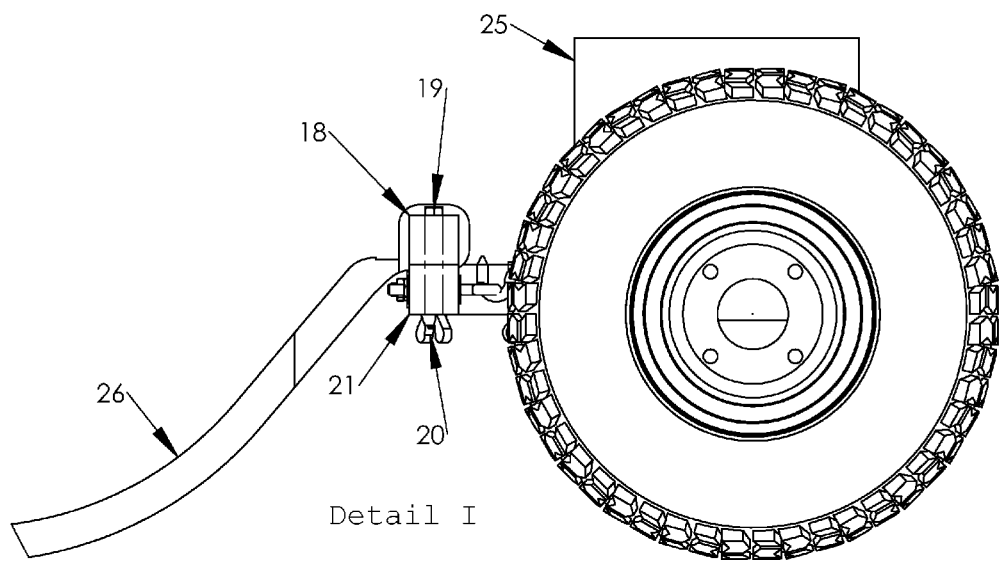
FIG. 37 is a detail view I of the side view shown in FIG. 36.

Next is an example on how to fold a sheet (item 26) correctly to install it onto the tarp connection tube (item 18). The sheet (item #26) must be folded to allow the tarp connection tube to roll the material onto itself and also keep the outer hole locations open to allow for installation as shown in FIG. 32. Lay the sheet (item 26) flat as in FIG. 21. Now fold the corners A to the B position as shown. Once this is completed it should look something like FIG. 22. Next fold the corners C to the D position as shown in FIG. 23. Once this is completed it should look something like FIG. 24. Now fold E to the F position as shown in FIG. 25. Once this is completed it should look something like FIG. 26.

Figure 27:
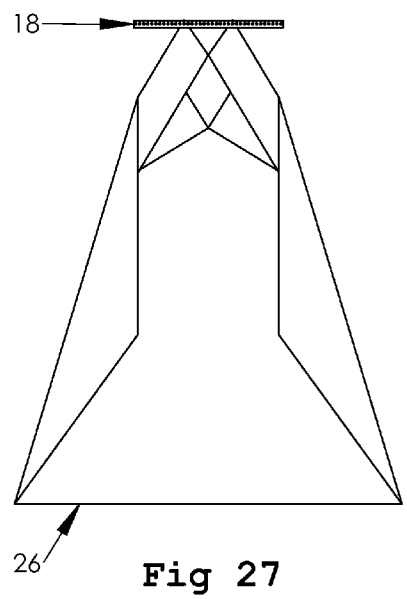
FIG. 27 is a top view of the finished folded sheet that has the tarp connector tube lying across the top of the folded area.
Figure 28:
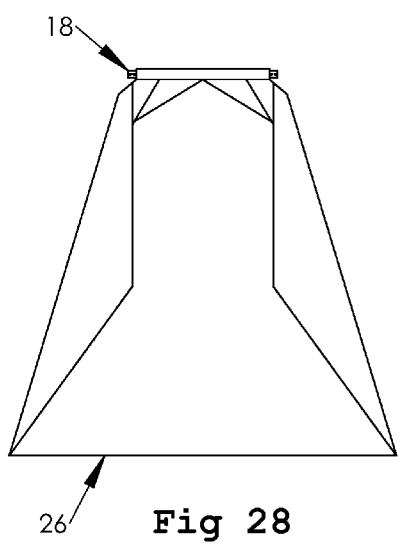
FIG. 28 is a top view showing the folded sheet rolled up onto the tarp connector tube.
Figure 29:
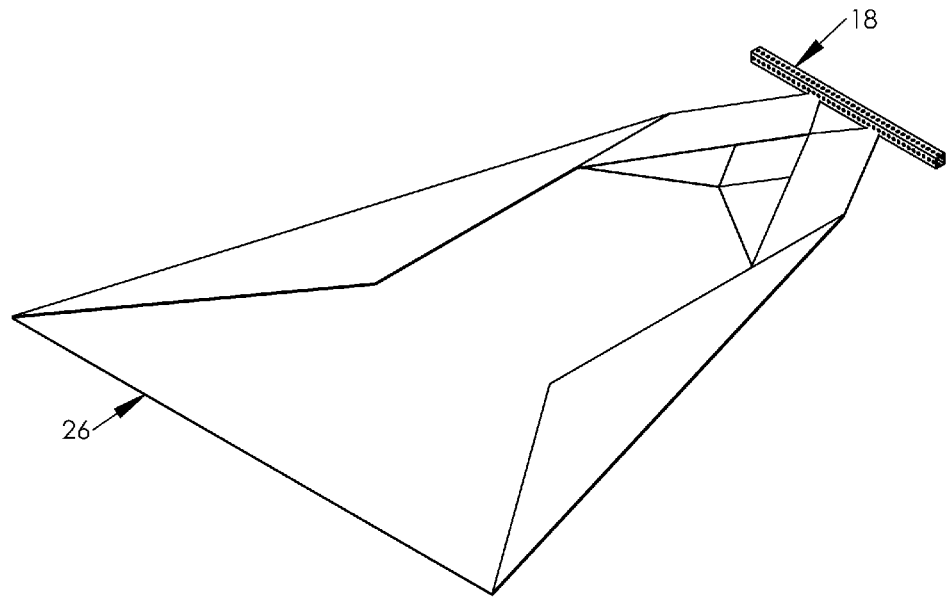
FIG. 29 is an isometric view of the folded sheet with the tarp bar lying across the folded area.
Figure 30:
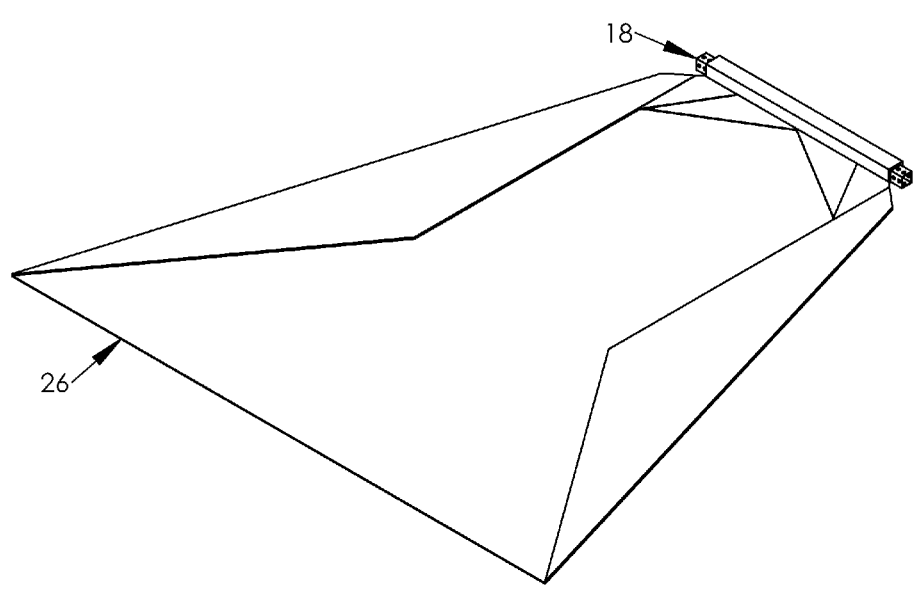
FIG. 30 is an isometric view showing the folded tarp or sheet rolled up onto the tarp connector tube as also shown in FIG. 28.
Figure 31:
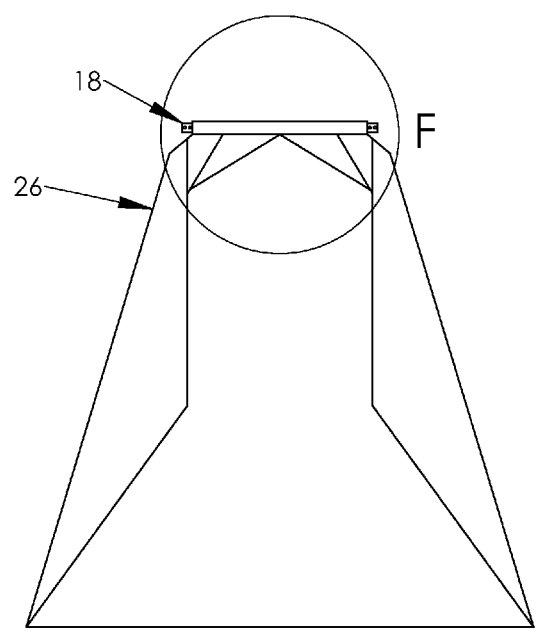
FIG. 31 is a top view of the tarp connector tube rolled up onto the folded tarp or sheet.

Now take the tarp connection tube (item 18) and lay it onto the folded sheet (item 26) as shown in FIGS. 27 and 29. Now hold the folded sheet (item 26) with the tarp connection tube (item 18) and roll it onto the tube four to five times over as shown in FIGS. 28 and 30. Once it is completed, it should look like FIGS. 31 and 32.

Now with the sheet (item 26) attached to the tarp connection tube (item 18), install this assembly onto the tarp support tube (item 21) with the two bolts (item 19) and wing nuts (item 20) as shown in FIG. 33-37. Once the wing nuts (item 20) are tightened down the sheet is now clamped to the assembly and it is ready to be used.

The assembly also has a secondary mount method that connects it to a vehicle or an ATV that has a standard receiver type hitch mount (item 32) for towing as shown in FIGS. 38 and 39.

Take the receiver adapter tube (item 27), and slide it into the standard receiver type hitch (item 32) on the vehicle as shown in FIG. 39. Make sure to line up the ²¹⁄₃₂" thru hole shown in FIG. 40 with the hitch pin thru hole on the vehicles receiver hitch (item 32). Next, take the support adapter tube (item 28) and slide it into the receiver adapter tube (item 27) until the ²¹⁄₃₂" thru holes shown in FIG. 42 on its sides line up with the others in the vehicles standard receiver type hitch (item 32) that will allow a hitch pin to be installed to hold it in place within the receiver hitch (item 32).

Next you take the complete assembly with the omitted parts and install the two ⅝" bolts (item 29) and two washers (item 30) into the top center thru holes that are in the tractor main support tube (item #1) and the spacer Tube (item 11) as shown in FIG. 38. Now, place the bolts (item 29) into the thru holes that are in the top of the support adapter tube (item 28) and insert the bolts into the thru holes and lay them flat onto each other. Next, install the washers (item 30) and nuts (item 31) onto the bolts (item 29) and tighten the assembly together. Now the assembly can be used with a standard receiver hitch type connection (item 32) as shown in FIG. 38-39. Just add the sheet (item 26) to the tarp connection bar (item 18) as shown earlier and install onto the assembly and it is ready to be used.

Figure 43:
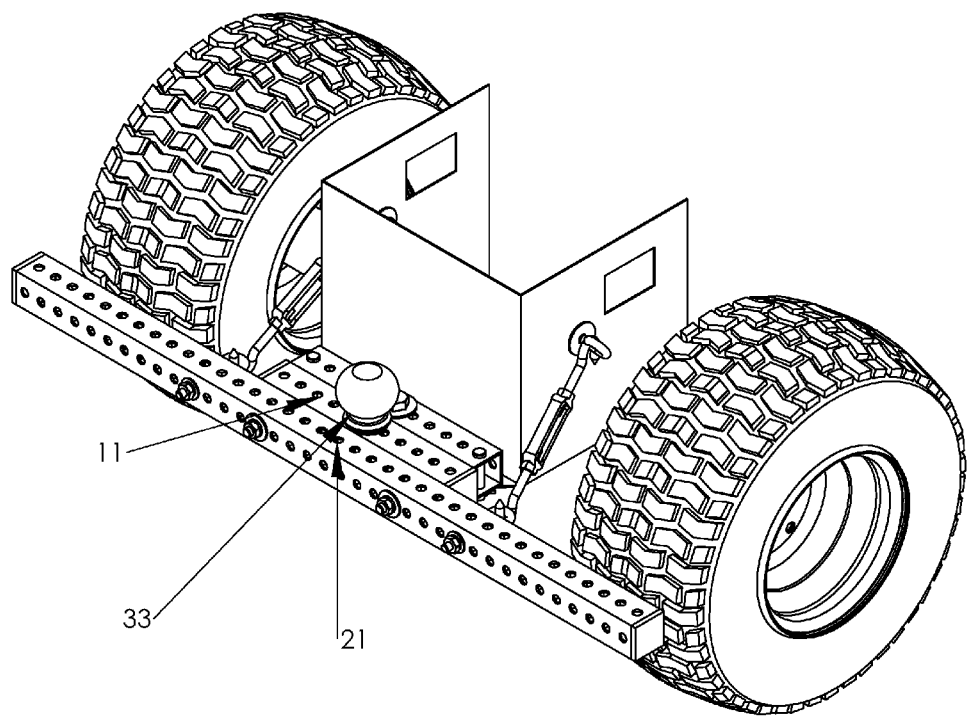
FIG. 43 is an isometric view of the Tarp Tow lower assembly mounted to the rear of a lawn tractor with a trailer ball attached in the spacer tube.

The last feature that this assembly can do is that a standard trailer ball (item 33) and its' hardware can be installed into the center thru hole in the spacer tube (item 11) or the tarp support tube (item 21) as shown in FIG. 43. To use, one will remove the tarp connection tube (item 18) and its' hardware (items 19-20) to allow a trailer to be connected to the trailer ball with no interference.

I claim:

1. A Tarp Tow assembly capable of being directly connected to a lawn tractor for holding or clamping down a foldable sheet material within the assembly for loading, holding, supporting, and transporting outdoor debris or material across the ground, said Tarp Tow assembly comprising:
    a) a tractor main support tube (item 1) is connected to a receiver plate or a hitch mount of a lawn tractor (item 25) by using a first bolt (item 5), a plurality of washers (item 6), a first lock washer (item 7), and a first nut (item 8) to hold the tractor main support tube and the receiver plate or hitch mount together;
    b) two clevis pins (item 2) installed in the top side of each end of the tractor main support tube (item 1), said clevis pins are held in place by two hair pin cotters (item 9), which are used to limit side to side movement during operation;
    c) a spacer tube (item 11) having first end caps (item 10), and a tarp support tube (item 21) having second end caps (item 10), wherein both the spacer tube and the tarp support tube are connected to the tractor main support tube by using two second bolts (item 4), and four second washers (item 3), and two second lock washers (item 24), and two second nuts (item 25) to hold the tractor main support tube, the spacer tube and the tarp support tube together;
    d) two eye bolts (item 12) are installed into a back side of the tarp support tube (item 21) using two third washers (item 22), a third lock washer (item 16), and a third nut (item 17) at each location wherein the two eye bolts (item 14) are mounted into a rear frame of a lawn tractor (item 25) using two fender washers (item 15), a fourth lock washer (item 16), and a fourth nut (item 17), wherein two turnbuckles (item 13) are connected to each respective eyebolt (item 12) for load transfer from the Tarp Tow assembly to the lawn tractor frame; and
    e) a tarp connection tube (item 18) with third end caps (item 10), wherein the tarp connection tube is clamped to the top of the tarp support tube (item 21) by using two third bolts (item 19), and two wing nuts (item 20) through opposite ends of the tarp connection tube (item 18) and the tarp support tube (item 21), wherein a tarp (item 26) is configured to be retained there between.

2. The tarp tow assembly according to claim 1, wherein a trailer ball is installed into a spacer tube center thru hole or a tarp support tube center thru hole for use to tow a trailer using a lawn tractor.

3. A tarp tow assembly capable of being directly connected to a lawn tractor or other vehicle for holding or clamping down a foldable sheet material within the assembly for loading, holding, supporting, and transporting outdoor debris or material across the ground, said tarp tow assembly comprising:
    a main support tube is connected to a support adapter tube by using a first bolt to hold the main support tube and support adapter tube together;
    a spacer tube and a tarp support tube, wherein both the spacer tube and the tarp support tube are connected to the main support tube by using two second bolts to hold the main support tube, the spacer tube, and the tarp support tube together, and wherein the spacer tube is connected to the support adapter tube by using a third bolt to hold the spacer tube and support adapter tube together;
    a tarp connection tube, wherein the tarp connection tube is clamped to the top of the tarp support tube by using two fourth bolts, wherein the two fourth bolts extend through opposite ends of the tarp connection tube and the tarp support tube, wherein a tarp is retained between the tarp connection tube and the tarp support tube;
    wherein the support adapter tube is telescopically interfitted within a receiver adapter tube; and
    wherein said receiver adapter tube is telescopically interfitted within a receiver type hitch of a vehicle, said receiver type hitch having a tubular portion with a square cross-sectional shape.

\* \* \* \* \*